United States Patent
Rice et al.

(10) Patent No.: US 8,996,624 B2
(45) Date of Patent: Mar. 31, 2015

(54) MANAGING PRESENCE IN COMMUNICATIONS SYSTEMS

(75) Inventors: Christopher W. Rice, Morris, NJ (US); Rittwik Jana, Montville, NJ (US); John F. Murray, Morris County, NJ (US); Ron Shacham, Clifton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 708 days.

(21) Appl. No.: 12/882,309

(22) Filed: Sep. 15, 2010

(65) Prior Publication Data

US 2012/0066463 A1    Mar. 15, 2012

(51) Int. Cl.
*G06F 15/16* (2006.01)
*G06F 11/30* (2006.01)
*H04L 29/08* (2006.01)

(52) U.S. Cl.
CPC ........ *G06F 11/3082* (2013.01); *G06F 11/3006* (2013.01); *H04L 67/24* (2013.01); *H04L 67/306* (2013.01); *H04L 67/2823* (2013.01)
USPC ........................................................ 709/206

(58) Field of Classification Search
CPC ............ G06F 11/3006; G06F 11/3082; H04L 67/306; H04L 67/24
USPC ................................... 709/206, 224; 711/161
See application file for complete search history.

(56) References Cited

U.S. PATENT DOCUMENTS

| | | | |
|---|---|---|---|
| 2006/0117050 A1* | 6/2006 | John et al. | 707/101 |
| 2007/0071209 A1* | 3/2007 | Horvitz et al. | 379/201.06 |
| 2009/0125585 A1* | 5/2009 | Krishnaswamy et al. | 709/203 |
| 2009/0198638 A1* | 8/2009 | Sakurai | 706/47 |

* cited by examiner

*Primary Examiner* — David X Yi
(74) *Attorney, Agent, or Firm* — Guntin & Gust, PLC; Ralph Trementozzi

(57) ABSTRACT

Raw presence data from a plurality of presence data sources is collected and processed into unified presence data. Unified presence data over a period of time before a first time is stored in a historical presence data archive. A probability of a presence variable having a specific value is generated based on unified presence data collected and processed at a second time on or after the first time, the historical presence data archive, and user profile data. Presence information is generated based on the probability and the user profile data. Presence data sources include both Session Initiation Protocol based and non Session Initiation Protocol based presence data sources. In an embodiment, non Session Initiation Protocol based unified presence data is transformed into Session Initiation Protocol based unified presence data.

15 Claims, 6 Drawing Sheets

MANAGING PRESENCE IN COMMUNICATIONS SYSTEMS

BACKGROUND

The present disclosure relates generally to communications systems, and more particularly to managing presence in communications systems.

Advances in communications systems continue to increase the number of modes of communications. Communications services have progressed from voice to multimedia; communications networks have progressed from fixed line to mobile; and communications devices have progressed from fixed-line telephones to mobile multimedia devices. Although the goal of these advances is to increase the capabilities for users to share information, the increase in the number of modes can actually have the unintended deleterious consequence of reduced efficiency.

Consider the example of a person (User A) with a fixed-line home phone, a mobile personal phone, a fixed-line business phone, and a mobile business phone. A caller (User B) could potentially dial four phones in an attempt to complete a voice call with User B. Now consider the example in which User A can access additional communications services for personal and business use (such as text messaging, e-mail, and video conferencing) on multiple communications devices (such as a desktop computer, a laptop computer, and a personal digital assistant). Not all communications services are supported on all communications devices, and not all communications services are available at all times. As an added complication, communications services can be provided by multiple communications service providers, which can vary from one geographical region to another. User B, then, can waste considerable time and resources attempting to reach User A via a mode of communication capable of sharing the information of interest.

Efficiency of a communications system, therefore, is dependent on User B having knowledge of the accessibility of User A via a specific mode of communication at a specific time. The accessibility of User A via a specific mode of communication at a specific time is a component of the presence of User A.

BRIEF SUMMARY

Raw presence data from a plurality of presence data sources is collected and processed into unified presence data. Unified presence data over a period of time before a first time is stored in a historical presence data archive. A probability of a presence variable having a specific value is generated based on unified presence data collected and processed at a second time on or after the first time, the historical presence data archive, and user profile data. Presence information is generated based on the probability and the user profile data.

Presence data sources include both Session Initiation Protocol based and non Session Initiation Protocol based presence data sources. In an embodiment, non Session Initiation Protocol based unified presence data is transformed into Session Initiation Protocol based unified presence data.

These and other advantages of the disclosure will be apparent to those of ordinary skill in the art by reference to the following detailed description and the accompanying drawings.

DETAILED DESCRIPTION

Figure 1:
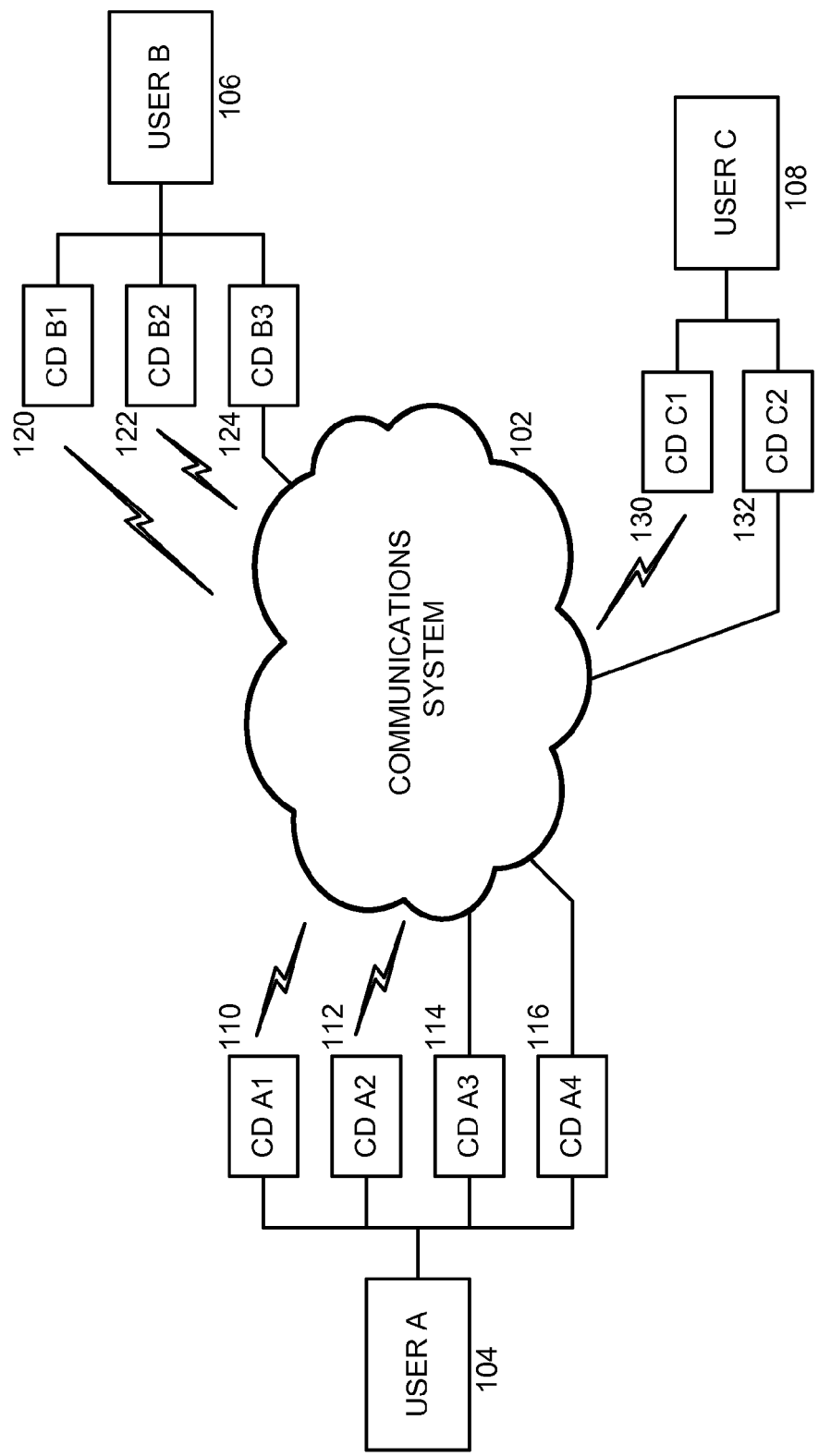
FIG. 1 shows a schematic diagram of a generic communications system.

FIG. 1 shows an example of a communications system 102 through which multiple users (user A 104, user B 106, and user C 108) can communicate (share information). Each user accesses communications system 102 via one or more communications devices (CDs). User A 104 has four CDs (CD A1 110-CD A4 116); user B 106 has three CDs (CD B1 120-CD B3 124); and user C 108 has two CDs (CD C1 130 and CD C2 132). A communications device can access communications system 102 via a fixed-line link or a wireless link. In the example shown, CD A3 114, CD A4 116, CD B3 124, and CD C2 132 access communications system 102 via fixed-line links; and CD A1 110, CD A2 112, CD B1 120, CD B2 122, and CD C1 130 access communications system 102 via wireless links. In typical instances, a user refers to a person, such as a customer or subscriber. A user, however, can also refer to an entity that is not a person; other examples of users include computers, robots, vehicles, machine controllers, sensors, and test instruments.

A communications device can support various modes of communication, such as voice, text, data, and video. In FIG. 1, CD A3 114 is a desktop telephone supporting voice only [plain old telephone service (POTS)]; CD A4 116 is a desktop personal computer supporting text and data only; CD A1 110 is a cell phone supporting voice and text only; and CD A2 112 is a laptop computer (outfitted with a wireless modem) supporting voice, text, data, and video. A fixed-line communications device is associated with a specific location; for example, CD A3 114 is located in the home of user A 104 and CD A4 116 is located in the office of user A 104.

Communications devices, furthermore, can be designated for specific purposes; for example, CD A1 110 is for personal use, and CD A2 112 is for business use. User A 104 can assume multiple personas (such as family member, friend, engineer, and volunteer mentor) in relation to other users. The communications services and communications devices accessible by user A 104 can be a function of the persona assumed by user A 104 at a specific time. For example, user A 104 can hold sensitive business discussions only via a secure telephone line at work. The modes of communication by which another user can access user A 104, furthermore, can be a function of the persona assumed by user A 104 at a specific time. For example, user A 104 can restrict access to his personal cell phone by granting access permission to only designated family members and friends. User B 106 and user C 108 can similarly assume different personas with access to specific communications services, specific communications devices, and specific other users at specific times.

As an example of a communications scenario, assume that user B 106 wants to communicate with user A 104. Access to multiple modes of communication allows user B 106, in principle, to choose the mode best suited for the specific information to be shared. The multiplicity of modes, however, can have the unintended deleterious consequence of reduced efficiency. As a simple example, user B 106 first dials the home phone of user A 104. If user A 104 does not pickup, then user B 106 dials the cell phone of user A 104. As the number of available modes of communication increases, the number of attempts that user B 106 needs to successfully communicate with user A 104 can also increase. For efficient communication, user B 106 should have knowledge of the specific modes of communication through which user A 104 can be accessed at specific times. The specific modes of communication through which user A 104 can be accessed at specific times are components of the presence of user A 104. More details of presence are discussed below. A service for providing user B 106 with presence information associated with user A 104 is referred to as presence service. A system that provides presence service is referred to as a presence service system.

Presence has multiple components on multiple hierarchies. Primary components of presence are availability, willingness, and location. Availability refers to the modes of communication through which a user can be reached; for example, whether a cell phone is turned on and within the coverage area of a service provider and whether the cell phone supports text or video in addition to voice. Willingness refers to the user's willingness to respond to a communication attempt; for example, his cell phone is on and within the coverage area of a service provider, but he is in a meeting and willing to respond to text messages but not to voice calls. Presence components can also provide more detailed information about the user such as current activity (for example, attending a meeting, eating dinner, and playing hockey). Another presence component is the mood (for example, happy or sad) of the user. The mood of the user affects his willingness to communicate. Complex components of presence are referred to as rich presence components.

Figure 2:
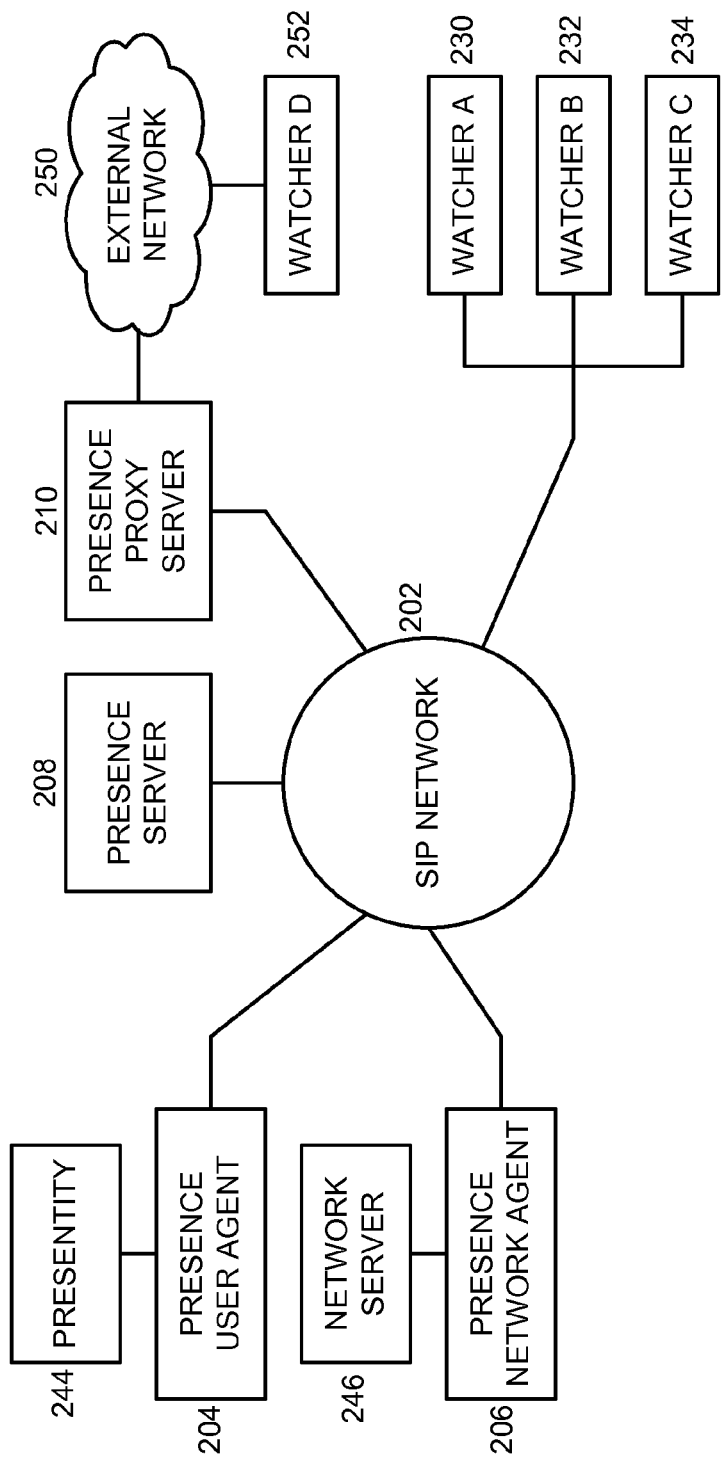
FIG. 2 shows a schematic diagram of a basic presence service system.

Various standards organizations, such as the Internet Engineering Task Force (IETF), 3rd Generation Partnership Project (3GPP), and Open Mobile Alliance (OMA), have defined specifications for presence service. The terminology and architecture, however, are not consistent across all the organizations. As one example, FIG. 2 shows a schematic diagram of a basic presence service system. The following logical entities exchange information via SIP network 202 that supports the Session Initiation Protocol (SIP): presence user agent 204, presence network agent 206, presence server 208, presence proxy server 210, watcher A 230, watcher B 232, and watcher C 234.

A presentity is a logical entity that has presence information associated with it. An example of a presentity 244 is user A 104 in FIG. 1. Presence information about a presentity may come from the presentity itself or from a network server. For example, network server 246 is aware of whether or not CD A1 110 is accessible via a wireless communications service.

Presentity 244 provides presence information to presence user agent (PUA) 204. PUA 204, for example, can be a client residing in CD A1 110. A network server 246 provides presence information to presence network agent (PNA) 206. PUA 204 and PNA 206 transmit their respective presence information to presence server 208 via SIP network 202. Presence server 208, therefore, stores presence information associated with user A 104 that is acquired from both user presence information sources and network presence information sources. In general, presence server 208 is a logical entity that receives presence information from multiple presence sources associated with the presentities it serves and makes this information available to watchers (discussed below) according to the rules associated with those presentities.

A watcher is a logical entity that requests presence information associated with a presentity from the presence service. FIG. 2 shows three watchers (watcher A 230, watcher B 232, and watcher C 234) communicating with SIP network 202. In this example, watcher A 230 and watcher B 232 correspond to user B 106 and user C 108, respectively, in FIG. 1. As discussed above, a user can refer to a logical entity that is not a person. Similarly, a watcher can also refer to a logical entity that is not a person. For example, in FIG. 2, watcher C 234 is a client automatically tracking the location of user A 104.

In a communications scenario, user B 106 and user C 108 want to communicate with user A 104 and, therefore, request presence information associated with user A 104. In this example, the requests for presence information are routed via SIP network 202 to presence server 208, which then returns presence information to user B 106 (watcher A 230) and user C 108 (watcher B 232). The presence information sent to watcher A 230 can be different from the presence information sent to watcher B 232. For example, user A 104 can restrict information concerning his location to only designated family members. User A 104 can also deny requests from specific watchers for presence information.

In FIG. 2, watcher D 252, connected to external network 250, does not communicate directly with SIP network 202. A request for presence information from watcher D 252 is routed via external network 250 to presence proxy server 210, which forwards the request to presence server 208. The requested presence information is then sent by presence server 208 via presence proxy server 210 and external network 250 to watcher D 252.

Figure 3:
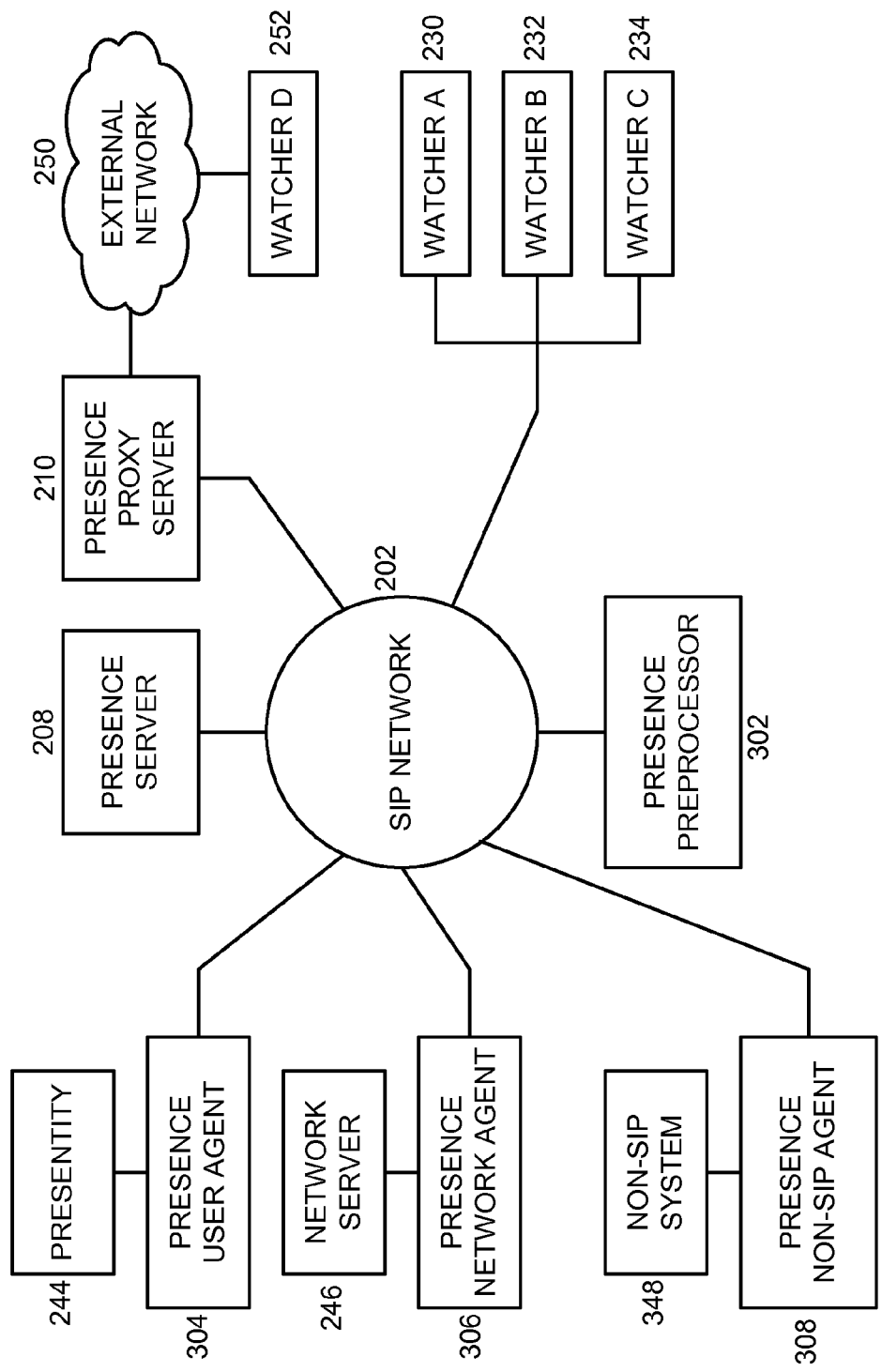
FIG. 3 shows a schematic diagram of an enhanced presence service system.

FIG. 3 shows a schematic diagram of a presence service system according to an embodiment of the disclosure. A presence preprocessor 302, communicating with SIP network 202, receives presence information from PUA 304 and PNA 306. As discussed below, PUA 304 and PNA 306 can have additional functions not typically supported by PUA 204 and PNA 206. Presence preprocessor 302 also receives presence data from presence non-SIP agent (PNSA) 308, which is a logical entity that receives presence information from a non-SIP system 348 and makes it available through a non-SIP protocol. An example of a system 348 is the legacy plain old telephone service (POTS) system. Another example of such a system 348 is a virtual private network (VPN). In general, presence preprocessor 302 receives presence information from multiple PUAs, multiple PNAs, and multiple PNSAs associated with multiple presentities. In the embodiment shown in FIG. 3, presence preprocessor 302 receives presence information from PUA 304, PNA 306 via SIP network 202, and PNSA 308 via a non-SIP network, preprocesses the presence information, and sends the preprocessed presence information to presence server 208 via SIP network 202.

Figure 4:
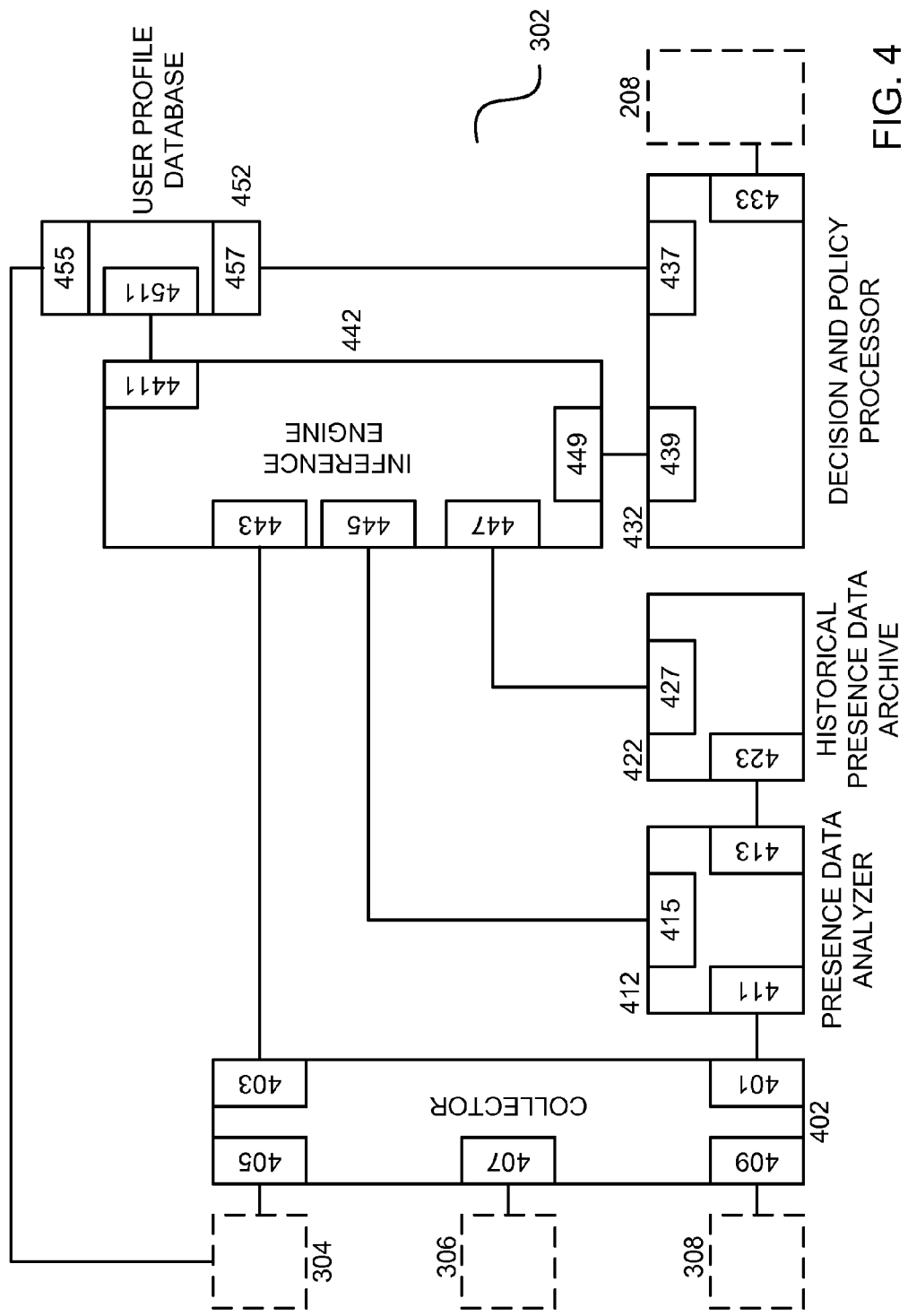
FIG. 4 shows a schematic diagram of a presence preprocessor.

FIG. 4 shows a functional block diagram of an embodiment of presence preprocessor 302. Presence preprocessor 302 includes the following functional entities: collector 402, presence data analyzer 412, historical presence data archive 422, decision and policy processor 432, inference engine 442, and user profile database 452. In FIG. 4, external interfaces between presence preprocessor 302 and other network elements (see FIG. 3) and internal interfaces between the functional entities within presence preprocessor 302 are referenced as logical input/output (i/o) ports.

Collector 402 receives presence data from PUA 304, PNA 306, and PNSA 308 via i/o port 405, i/o port 407, and i/o port 409, respectively. Herein, presence data received by collector 402 at its inputs is also referred to as raw presence data. If a presentity has multiple personas, collector 402 collects all presence data associated with the presentity. Collector 402 performs multiple functions. Collector 402 checks for consistency with respect to specific protocols (for example, via PNA authentication) and verifies that specific data can be collected from specific PUAs, PNAs, and PNSAs. Collector 402 also deletes unnecessary data elements, deletes redundant data, resolves conflicting data from multiple communications devices of the same type (for example, multiple cell phones), resolves conflicting data from duplicate service subscriptions, and organizes all the data into a comprehensive unified dataset, including the times at which the data was generated or collected. Since different presence information can be reported to different watchers, depending on parameters such as the user persona and the relationship of a watcher to the user, a unified dataset is more efficient and more accurate than multiple datasets.

Since presence data can change dynamically, collector 402 processes the presence data in real time (or near real time) to avoid reporting out-of-date presence information. In a large communications system, presence data can potentially create a heavy traffic load. Collector 402 therefore provides feedback to PUA 304, PNA 306, and PNSA 308 to control the flow of presence data from the presence data sources. Herein, presence data generated at the outputs of collector 402 is also referred to as unified presence data.

As discussed above, the unified presence data processed by collector 402 includes the times at which the raw presence data was generated or collected. Collector 402 sends the unified presence data from i/o port 401 of collector 402 to i/o port 411 of presence data analyzer 412. The presence data analyzer 412 transforms the unified presence data received at i/o port 411 into a canonical form.

In an embodiment, the canonical form is specified by the SIP-based Session Initiation Protocol for Instant Messaging and Presence Leveraging Extensions (SIMPLE) supported by the Internet Engineering Task Force. In this embodiment, SIP-based unified presence data received at i/o port 411 is primarily passed through by presence data analyzer 412. Non-SIP-based unified presence data received at i/o port 411 is transformed into SIP-based data; for example, Short Message Service (SMS) data is transformed into SIP-based canonical presence data, and Hypertext Transfer Protocol (HTTP) data is transformed into SIP-based canonical presence data. Other embodiments of presence data analyzer 412 transform the unified presence data received at i/o port 411 into other user-specified canonical forms. The presence data analyzer performs two types of processing on the unified presence data. One is basic translation to put it into canonical form, as already described. There is another level of translation besides this simple mapping. This includes interpretation of the data. An example of interpreting the data may be determining whether an update from the PUA is actually user feedback or not. Another example is recognizing that a calendar entry is "tentative." Besides the canonical SIP-based data, additional meta-data may be added to the presence data. This may be added based on interpretation of the data.

The output canonical presence data generated by the presence data analyzer 412 is sent from i/o port 413 of presence data analyzer 412 to i/o port 423 of historical presence data archive 422 for storage. In an embodiment, the unified presence data as received at i/o port 411 of presence data analyzer 412 is also sent to historical presence data archive 422 for storage; for example, it can be passed through from i/o port 413 of presence data analyzer 412 to i/o port 423 of historical presence data archive 422. In another embodiment, collector 402 sends unified presence data to historical presence data archive 422 via separate i/o ports. The stored historical presence data is used for trend analysis and for modelling the behavior of the user.

User profile database 452 stores user profiles. As discussed above, a user can have multiple personas. A user has a user profile that defines how each persona will utilize the available presence data (in various forms). The user profile defines two types of rules for each persona (referred to as user profile persona rules): First, which sources may be used for determining presence of the user. Secondly, which presence values are allowed to be released as the final presence information. The first type of rule is needed in order to avoid presence information being indirectly leaked based on a source that watchers should not know about. A user configures his user profile via PUA 304 and i/o port 455 of user profile database 452. The user profile is sent from i/o port 4511 of user profile database 452 to i/o port 4411 of inference engine 442 (discussed in further detail below). The user profile is also sent from i/o port 457 of user profile database 452 to i/o port 437 of decision and policy processor 432 (discussed in further detail below).

Each persona can have different sets of rules governing specific sources of presence information that may be used to determine presence and specific presence information reported to watchers. Watchers need to register with presence server 208. The user approves (authorizes) specific watchers. As an example, consider a user with four personas:

Persona 1: Consumer Public
Authorized Watchers Friends and Acquaintances
Rule: Access to only a controlled subset of presence attributes based on some consumer sources.
Persona 2: Consumer Private
Authorized Watchers: Family and Close Friends
Rule: Family and close friends can get access to a detailed set of presence attributes based on consumer sources.
Persona 3: Enterprise Public
Authorized Watchers: External Customers and Partners
Rule: External customers and partners get access to only a controlled subset of presence attributes based on enterprise sources.
Persona 4: Enterprise Private
Authorized Watchers: Internal Users
Rule: Key team members who need to keep in touch with the user get access to a detailed set of presence attributes based on enterprise sources.

Inference engine 442 receives input from multiple sources. User profile database 452 sends user profile data from i/o port 4511 of user profile database 452 to i/o port 4411 of inference engine 442. Presence data analyzer 412 sends current canonical presence data from i/o port 415 of presence data analyzer 412 to i/o port 445 of inference engine 442. In some embodiments, collector 402 also sends current unified presence data from i/o port 403 of collector 402 to i/o port 443 of inference engine 442. Historical presence data archive 422 sends historical presence data from i/o port 427 of historical presence data archive 422 to i/o port 447 of inference engine 442. PUA 304 sends user feedback, which is regular presence updates made by the user, to i/o port 405 of the collector. This is pushed from i/o port 401 to i/o port 411 of the presence data analyzer. The presence data analyzer determines that this is user feedback, and sends it from i/o port 415 to i/o port 445 of the inference engine. User feedback permits a user to fine-tune the operation of inference engine 442; for example, by rating the effectiveness of the output generated by the inference engine 442.

Inference engine 442 generates rules based on the received input and updates the rules when the presence data (from all inputs to the inference engine) is updated. Since users typically follow routines (for example, according to daily, weekly, and monthly schedules), inference engine 442 performs pattern recognition and analysis. The results of the pattern recognition and analysis are used as inputs to rule generation.

In an embodiment, inference engine 442, using a probabilistic model, executes an algorithm to determine the probability that a specific presence variable (an element of presence information) has a specific value at the current time. For example, if the presence variable is the location of a user, the output of inference engine 442 is "The user is currently at specific location s with a probability p". An example of specific output is: "The user is currently at the gym with 80% probability."

The output of inference engine 442 is sent from i/o port 449 of inference engine 442 to i/o port 439 of policy and decision processor 432. User profile data is sent from i/o port 457 of user profile database 452 to i/o port 437 of decision and policy processor 432. The policy function identifies the specific presence data (from all inputs to the decision and policy processor 432) that can be used for a specific persona. The policy function focuses on privacy and data protection.

The decision processor receives the current probabilities of presence variables and the user profile persona rules to determine the presence information to be published. The decision processor selects the presence attributes for each persona such that private presence data is not leaked to unauthorized watchers.

The decision and policy processor 432 processes all the input it receives to generate a final set of presence information (for example, via a SIP publish command). The final set of presence information is sent from i/o port 433 of decision and policy processor 432 to presence server 208 via SIP network 202 (FIG. 2). If there are multiple personas that have different rules, then multiple versions of the presence information must be sent out. This is because each persona will allow different sources and different attributes to be revealed. Presence server 208 then sends a specific set of presence information to a specific watcher requesting the presence information.

Figure 5:
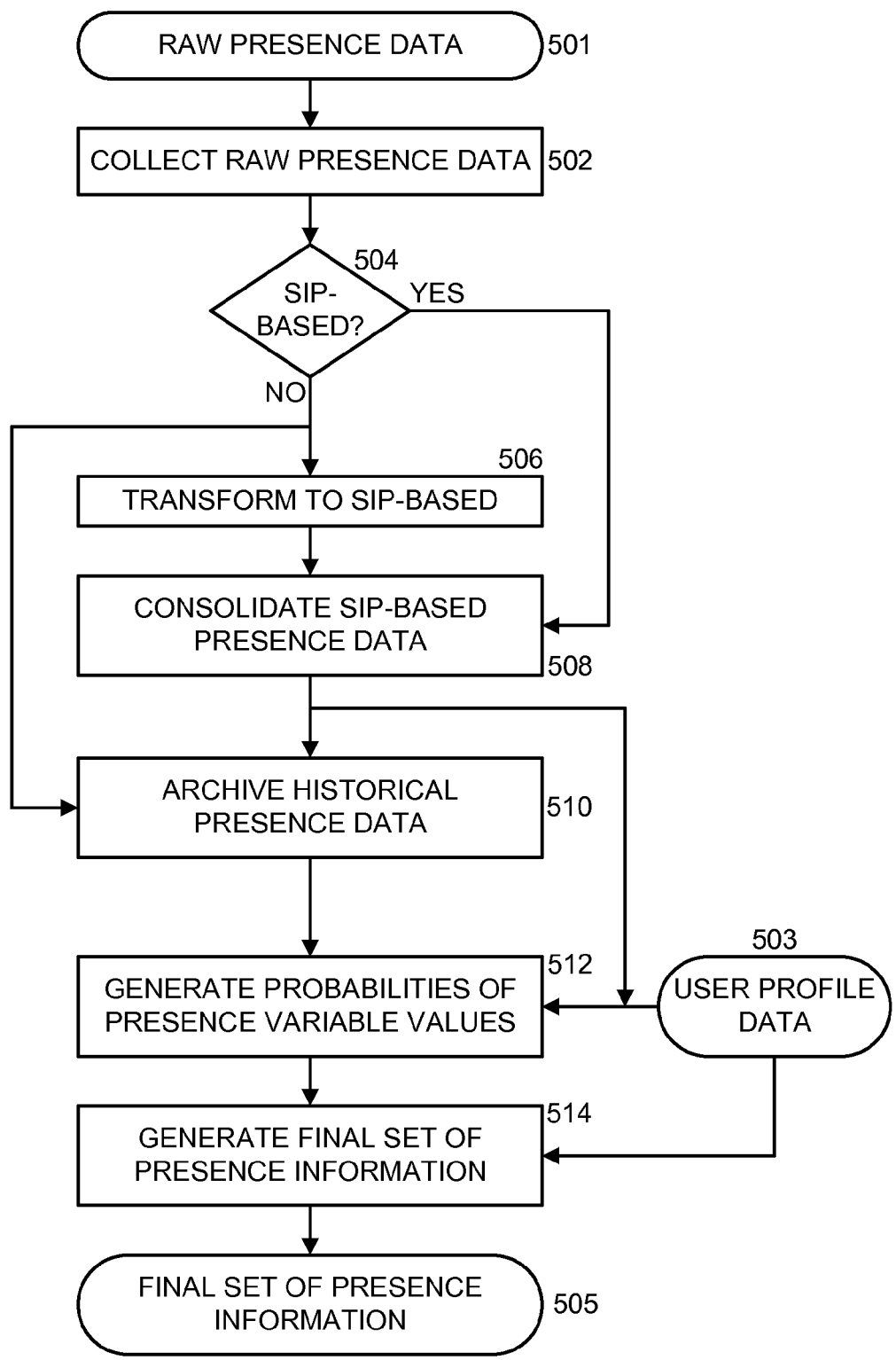
FIG. 5 shows a flowchart of steps for a method of providing enhanced presence service.

FIG. 5 shows a flowchart of a method for processing presence information, according to an embodiment. In an embodiment, the method is performed by presence preprocessor 302 in FIG. 3. In step 502, the process collects raw presence data 501 from multiple presence data sources, such as presence user agents, presence network agents, and presence non-SIP agents and generates unified presence data. The specific presence data sources can vary with time. The process then passes to step 504, in which the unified presence data is analyzed. If the unified presence data is SIP-based, it is passed to step 508. If the unified presence data is non-SIP based, it is passed to step 506, in which it is transformed to SIP-based canonical presence data. The transformed SIP-based canonical presence data is consolidated with the initial SIP-based presence data (from step 504) in step 508.

The consolidated SIP-based presence data is then passed to step 510 in which it is archived in a historical presence data archive. The initial non-SIP based unified presence data (from step 504) is also archived in step 510. Step 501-step 510 are repeated over a user-defined time interval prior to a user-defined reference time (also referred to as the time of interest) to build the historical presence data archive; an example of a user-defined reference time is the current time.

The process then passes to step 512, in which the current consolidated SIP-based presence data (from step 508) collected or processed at a time greater than or equal to the user-defined reference time, archived historical presence data (from step 510), and user profile data 503 are inputted into an inference engine, which generates probabilities of presence variables having specific values. The probabilities may also be generated based on a set of user-specified rules and algorithms.

The process then passes to step 514, in which the probabilities of presence variables having specific values (from step 512), and user profile data 503 are inputted into a decision and policy processor, which process all the input to generate the final set of presence information 505 to be sent to a presence server. The final set of presence information may also be generated based on a set of user-specified rules and algorithms.

Figure 6:
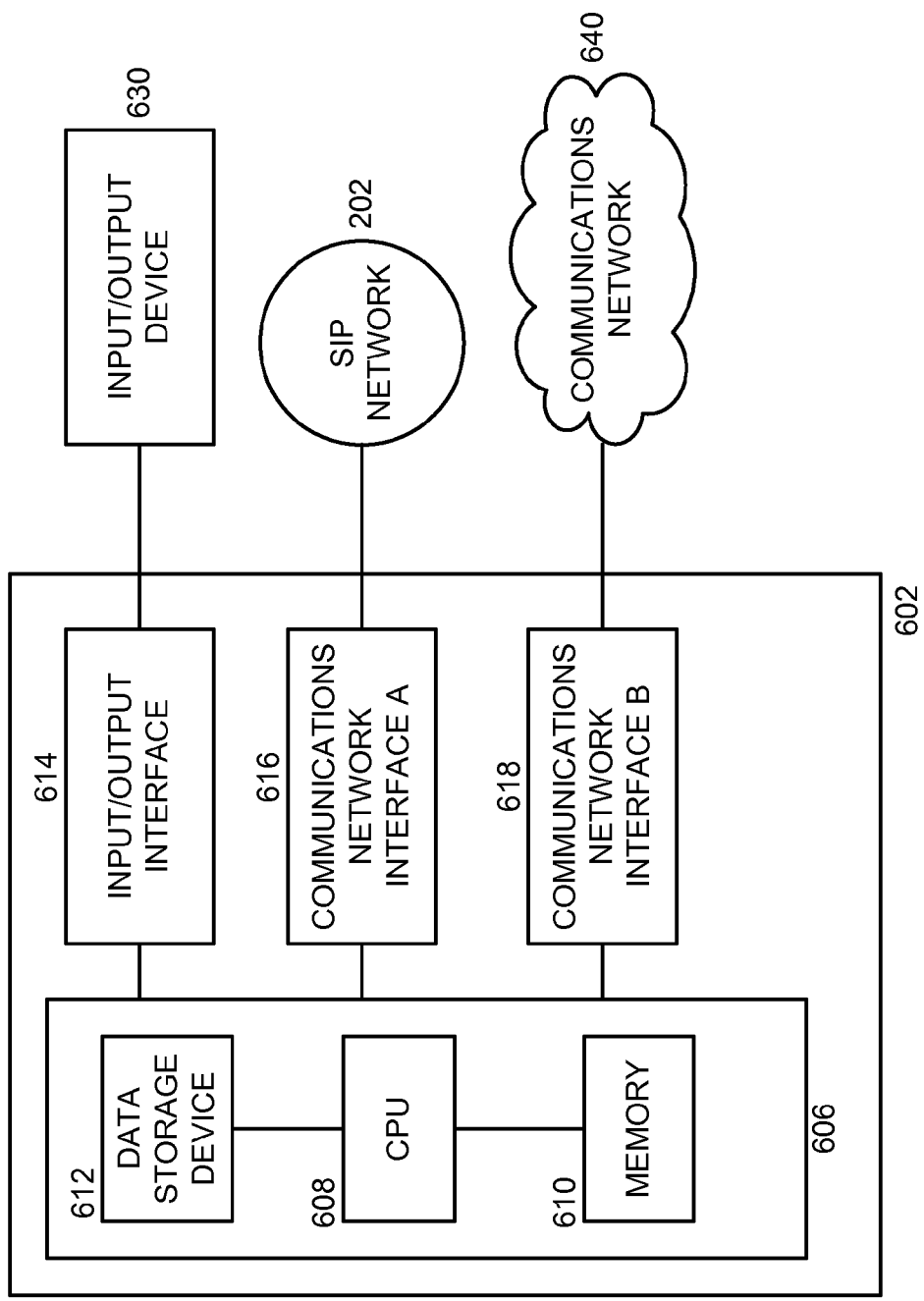
FIG. 6 shows a schematic diagram of a computational system for implementing a presence preprocessor.

FIG. 4 described a presence preprocessor 302 in terms of functional entities. An embodiment of a computational system for implementing a presence preprocessor 302 is shown in FIG. 6. One skilled in the art can construct the computational system 602 from various combinations of hardware, firmware, and software. One skilled in the art can construct the computational system 602 from various combinations of electronic components, such as general purpose microprocessors, digital signal processors (DSPs), application-specific integrated circuits (ASICs), and field-programmable gate arrays (FPGAs).

Computational system 602 includes computer 606, which includes a central processing unit (CPU) 608, memory 610, and data storage device 612. Data storage device 612 includes at least one non-transitory, persistent, tangible computer readable medium, such as non-volatile semiconductor memory, a magnetic hard drive, and a compact disc read only memory.

Computational system 602 can further include one or more input/output interfaces that interface computer 606 with input/output devices. For example, input/output interface 614 interfaces computer 606 to input/output device 630. Examples of input/output device 630 include a keyboard, a mouse, and a local access terminal. Data, including computer executable code, can be transferred to and from computer 606 via input/output interface 614.

Computational system 602 can further include one or more communications network interfaces that interface computer 606 with communications networks, such as local area networks and wide area networks. Data, including computer executable code, can be transferred to and from computer 606 via communications network interfaces. In FIG. 6, communications network interface A 616 interfaces computer 606 with SIP network 202, and communications network interface B 618 interfaces computer 606 with communications network 640.

As is well known, a computer operates under control of computer software, which defines the overall operation of the computer and applications. CPU 608 controls the overall operation of the computer and applications by executing computer program instructions that define the overall operation and applications. The computer program instructions can be stored in data storage device 612 and loaded into memory 610 when execution of the program instructions is desired. The method steps shown in the flowchart in FIG. 5 can be defined by computer program instructions stored in the memory 610 or in the data storage device 612 (or in a combination of memory 610 and data storage device 612) and controlled by the CPU 608 executing the computer program instructions. For example, the computer program instructions can be implemented as computer executable code programmed by one skilled in the art to perform algorithms implementing the method steps shown in the flowchart in FIG. 5. Accordingly, by executing the computer program instructions, the CPU 608 executes algorithms implementing the method steps shown in the flowchart in FIG. 5.

The foregoing Detailed Description is to be understood as being in every respect illustrative and exemplary, but not restrictive, and the general inventive concept disclosed herein is not to be determined from the Detailed Description, but rather from the claims as interpreted according to the full breadth permitted by the patent laws. It is to be understood that the embodiments shown and described herein are only illustrative of the principles of the general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method comprising:
    at each of a plurality of times before a first time: collecting, by a system comprising a processor, first raw presence data of a user from a first plurality of presence data sources; processing, by the system, the first raw presence data into first unified presence data; and storing, by the system, the first unified presence data in a historical presence data archive;
    at a second time after the first time: collecting, by the system, second raw presence data of the user from a second plurality of presence data sources; processing, by the system, the second raw presence data into second unified presence data; and storing, by the system, the second unified presence data in the historical presence data archive;
    generating, by the system, for each persona of a plurality of personas of the user a respective first probability of a presence variable having a specific value at a current time, the respective first probability based on the second unified presence data, the historical presence data archive and respective first user profile rules, wherein the respective first user profile rules identify a respective group of presence data sources of the plurality of presence data sources to be used in the generating of the respective first probability of the presence variable;
    generating, by the system, current first presence information for each persona of the plurality of personas based on the respective first probability and the respective first user profile rules;
    generating, by the system, a second probability of a presence variable having a specific value, the second probability based on the second unified presence data, the historical presence data archive, and second user profile rules; and
    generating, by the system, second presence information based on the second probability and the second user profile rules,
    wherein the presence variable is selected from a group consisting of availability, willingness, location and combinations thereof, and wherein one of the current first or second presence information comprises a group of presence variables of a plurality of presence variables allowable for release, wherein the group of presence variables allowable for release are identified by one of the first or second user profile rules, and wherein each persona of the plurality of personas allows for a different combination of presence data sources of the plurality of data sources to be revealed.

2. The method of claim 1, wherein the first unified presence data comprises session initiation protocol based unified presence data, wherein the first unified presence data comprises first raw presence data of the user collected from the first plurality of data sources.

3. The method of claim 1, wherein the first unified presence data comprises non session initiation protocol based unified presence data, and further comprising:
    transforming, by the system, the non session initiation protocol based unified presence data into session initiation protocol based unified presence data.

4. The method of claim 1, wherein the second unified presence data comprises non session initiation protocol based unified presence data, and further comprising:
    transforming, by the system, the non session initiation protocol based unified presence data into session initiation protocol based unified presence data.

5. The method of claim 1, wherein each of the first plurality of presence data sources and each of the second plurality of presence data sources is selected from a group consisting of a presence user agent, a presence network agent and a presence non session initiation protocol agent.

6. An apparatus comprising:
    a memory to store computer instructions; and
    a processor coupled to the memory, wherein the processor, responsive to executing the computer instructions, performs operations comprising:
    at each of a plurality of times before a first time: collecting first raw presence data of a user from a first plurality of presence data sources; processing the first raw presence data into first unified presence data; and storing the first unified presence data in a historical presence data archive;
    at a second time after the first time: collecting second raw presence data of the user from a second plurality of presence data sources; processing the second raw presence data into second unified presence data; storing the second unified presence data in the historical presence data archive;
    generating, for each persona of a plurality of personas of the user, a respective first probability of a presence variable having a specific value at a current time, the respective first probability based on the second unified presence data, the historical presence data archive and respective first user profile rules, wherein the respective first user profile rules identify a respective group of presence data sources of the plurality of presence data sources to be used in the generating of the respective first probability of the presence variable;
    generating current first presence information for each persona of the plurality of personas based on the respective first probability and the first user profile rules;
    generating a second probability of a presence variable having a specific value, the second probability based on the second unified presence data, the historical presence data archive and second user profile rules; and
    generating second presence information based on the second probability and the second user profile rules,
    wherein the presence variable is selected from a group consisting of availability, willingness, location and combinations thereof, and wherein one of the current first or second presence information comprises a group of presence variables of a plurality of presence variables allowable for release, wherein the group of presence variables allowable for release are identified by one of the first or second user profile rules, and wherein each persona of the plurality of personas allows for a different combination of presence data sources of the plurality of data sources to be revealed.

7. The apparatus of claim 6, wherein the first unified presence data comprises session initiation protocol based unified presence data, wherein the first unified presence data comprises first raw presence data of the user collected from the first plurality of data sources.

8. The apparatus of claim 6, wherein the first unified presence data comprises non session initiation protocol based unified presence data, the operations further comprising:
   transforming the non session initiation protocol based unified presence data into session initiation protocol based unified presence data.

9. The apparatus of claim 6, wherein the second unified presence data comprises non session initiation protocol based unified presence data, the operations further comprising:
   transforming the non session initiation protocol based unified presence data into session initiation protocol based unified presence data.

10. The apparatus of claim 6, wherein each of the first plurality of presence data sources and each of the second plurality of presence data sources comprises one of a presence user agent, a presence network agent or a presence non session initiation protocol agent.

11. A machine-readable storage device storing executable instructions, which responsive to being executed by a processor, cause the processor to perform operations comprising:
   at each of a plurality of times before a first time: collecting first raw presence data of a user from a first plurality of presence data sources; processing the first raw presence data into first unified presence data; and storing the first unified presence data in a historical presence data archive; and
   at a second time after the first time: collecting second raw presence data of the user from a second plurality of presence data sources; processing the second raw presence data into second unified presence data; storing the second unified presence data in the historical presence data archive;
   generating, for each persona of a plurality of personas, a respective first probability of a presence variable having a specific value at current time, the respective first probability based on the second unified presence data, the historical presence data archive and respective first user profile rules, wherein the respective first user profile rules identify a respective group of presence data sources of the plurality of presence data sources to be used in the generating of the respective first probability of the presence variable;
   generating current first presence information for each persona of the plurality of personas based on the respective first probability and the respective first user profile rules;
   generating a second probability of a presence variable having a specific value, the second probability based on the second unified presence data, the historical presence data archive and second user profile rules; and
   generating second presence information based on the second probability and the second user profile rules,
   wherein the presence variable is selected from the group consisting of availability, willingness, location and combinations thereof, and wherein one of the current first or second presence information comprises a group of presence variables of a plurality of presence variables allowable for release, wherein the group of presence variables allowable for release are identified by one of the respective first or second user profile rules, and wherein each persona of the plurality of personas allows for a different combination of presence data sources of the plurality of data sources to be revealed.

12. The machine-readable storage device of claim 11, wherein the first unified presence data comprises session initiation protocol based unified presence data, wherein the first unified presence data comprises first raw presence data of the user collected from the first plurality of data sources.

13. The machine-readable storage device of claim 11, wherein the first unified presence data comprises non session initiation protocol based unified presence data, and wherein the operations further comprise:
   transforming the non session initiation protocol based unified presence data into session initiation protocol based unified presence data.

14. The machine-readable storage device of claim 11, wherein the second unified presence data comprises non session initiation protocol based unified presence data, wherein the operations further comprise:
   transforming the non session initiation protocol based unified presence data into session initiation protocol based unified presence data.

15. The machine-readable storage device of claim 11, wherein each of the first plurality of presence data sources and each of the second plurality of presence data sources comprises one of a presence user agent, a presence network agent or a presence non session initiation protocol agent.

* * * * *